UNITED STATES PATENT OFFICE 2,101,560

MIXED THIENYL-ALKYL KETONES

Anderson W. Ralston, Chicago, Ill., assignor to Armour and Company, Chicago, Ill., a corporation of Illinois No Drawing. Application October 8, 1936, Serial No. 104,704

5 Claims. (Cl. 260—53)

This invention relates to arylalkyl ketones and it comprises as new compounds ketones having the generic structure

wherein R is a thienyl radical and R' is an alkyl radical having eleven to seventeen carbon atoms.

The higher fatty acids, and by that I mean those fatty acids derived from vegetable and animal oils and fats, are extremely abundant materials and can be obtained at little expense. They have never, however, been used to any great extent as raw materials for the synthesis of more valuable substances. These fatty acids have been used almost exclusively in the soap industry, for making candles, etc., and in but relatively few instances have they been used as raw materials in what might be termed the "fine" organic chemical field.

I have now discovered a new class of compounds which can be made from higher fatty acids and which have chemical and physical properties of marked technical and commercial interest. I have discovered that the higher fatty acid chlorides, such as stearyl chloride, myristyl chloride, lauryl chloride, and other acid chlorides derived from and corresponding to the higher fatty acids, can be made to react with thiophene or substituted thiophenes to give arylalkyl ketones having valuable properties which suit them for use in many technical applications. These arylalkyl ketones are waxy solids or high boiling liquids and can be purified by crystallization from organic solvents such as benzene, alcohol, and others, or they can be purified by distillation to give the pure ketones. I have discovered that when dissolved in lubricating oils they impart to the lubricant the ability to withstand extreme pressures. I have also discovered that they are good dielectrics and also that they can be used in waxing and polishing compositions. In addition, they can be added to boiler water and thus used to prevent foaming in boilers operating under high pressures.

In its broad aspects my invention comprises new products having the generic structure

where R is a thienyl radical which may be substituted or not, and R' is an alkyl radical containing the alkyl residue of a higher fatty acid. Thus, as an example, one of the new products falling within the scope of my invention is 2-stearylthiophene

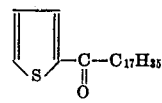

In this case the $C_{17}H_{35}$, or heptadecyl radical, is the alkyl residue of stearic acid, $C_{17}H_{35}COOH$. This particular ketone has a melting point of 50–1°. Other typical ketones falling within the scope of my invention are 2-myristylthiophene (B. P. 205–210°/4 mm.), $$n_D^{25}1.4961\ d\frac{25}{25}0.9506$$

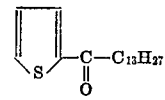

and 2-laurylthiophene (B. P. 190–5°/5 mm.), $$n_D^{25}1.5019\ d\frac{25}{25}0.9632$$

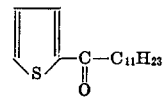

All of the products of the present invention can be made by the Friedel-Crafts or Grignard synthesis.

Thus, for example, when I wish to make 2-tridecylthiophene I start with thiophene and myristyl chloride. The myristyl chloride can be made in any of the known ways from myristic acid. Generally the myristic acid is reacted with phosphorus pentachloride or other chlorinating agents commonly used for converting aliphatic carboxylic acids to their corresponding chlorides. I then prepare a mixture containing 8.4 parts by weight of thiophene, 24.6 parts by weight of myristyl chloride and 100 parts by weight of benzene. This mixture is cooled in an ice bath and 30 parts by weight of tin tetrachloride are added with constant stirring, and the mixture is stirred until there is no further evolution of hydrochloric acid. The reaction mixture is then poured onto a mixture of ice and dilute hydrochloric acid to hydrolyze the complex tin compound formed in the reaction. It is then placed in a flask and subjected to steam distillation in order to complete the hydrolysis and to remove the benzene. During the steam distillation the ketone will separate from the aqueous reaction mixture and float upon the top of the mixture.

It is then separated from the water, dried, and distilled under a vacuum. A 70% yield of ketone is obtained having a boiling point of 205–10°/4 mm.

In a similar manner I can start with a substituted thiophene, in which case substituted ketones are obtained. Likewise, as stated, I can start with any fatty acid chloride of the fatty acids having twelve or more carbon atoms since these fatty acids are readily available and cheap.

Having thus described my invention what I claim is:

1. An aralkyl ketone having the formula

wherein R is a thienyl radical and R' is an alkyl radical having from eleven to seventeen carbon atoms.

2. An aralkyl ketone having the formula

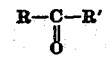

wherein R is a thienyl radical and R' is heptadecyl.

3. 2-stearylthiophene.
4. 2-myristylthiophene.
5. 2-laurylthiophene.

ANDERSON W. RALSTON.